June 28, 1938. H. B. HOLLAND 2,121,797
TRANSCRIPT OR NOTE HOLDER
Filed Oct. 19, 1936 2 Sheets-Sheet 1
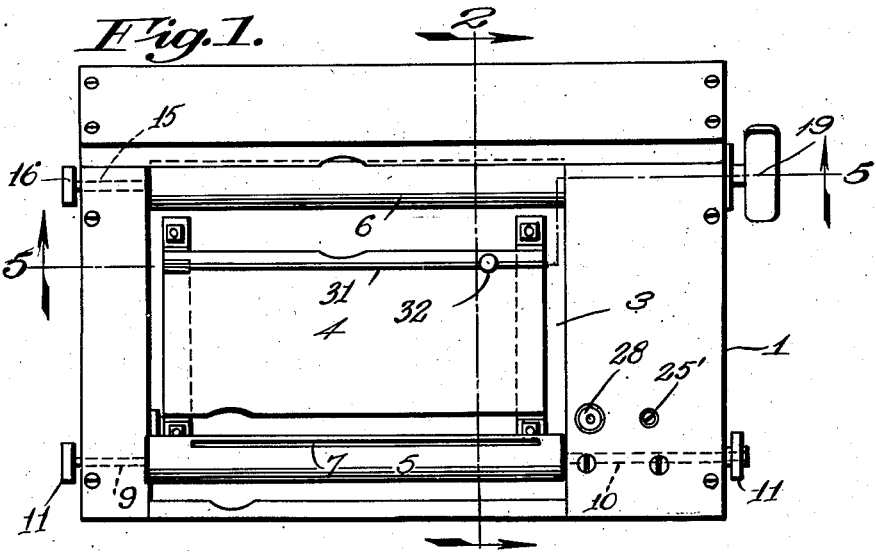
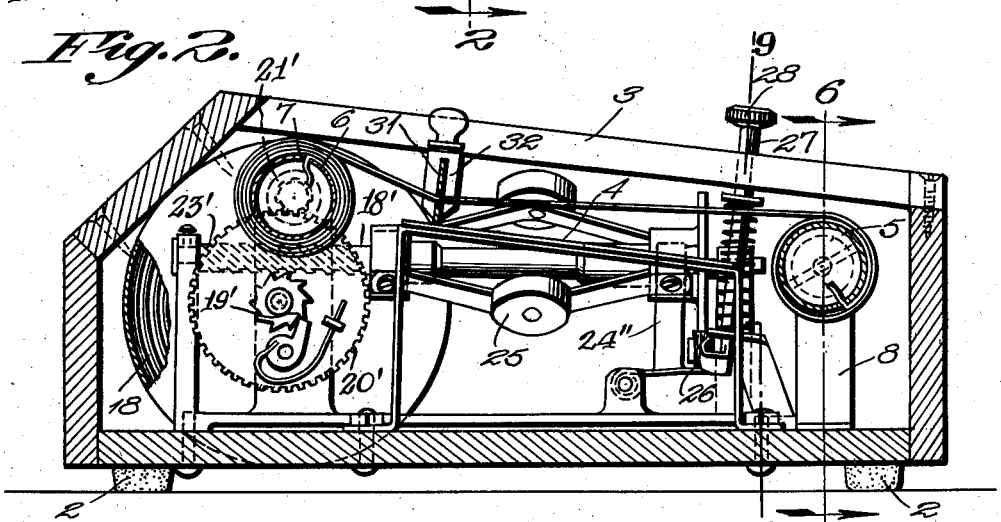
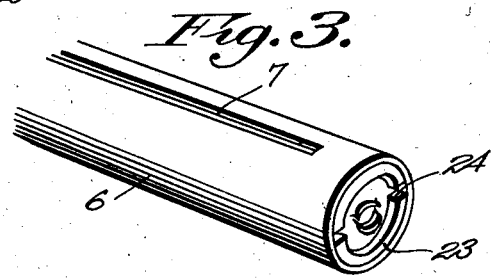
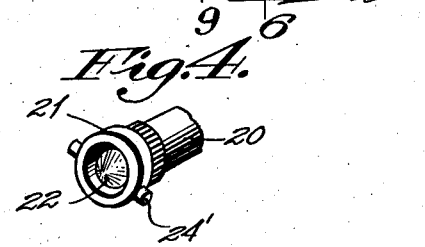
Hal B. Holland
INVENTOR

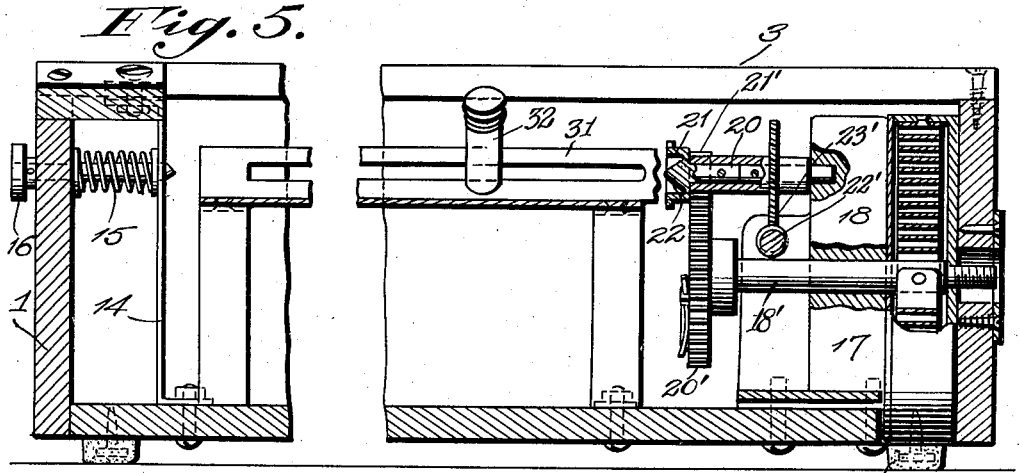
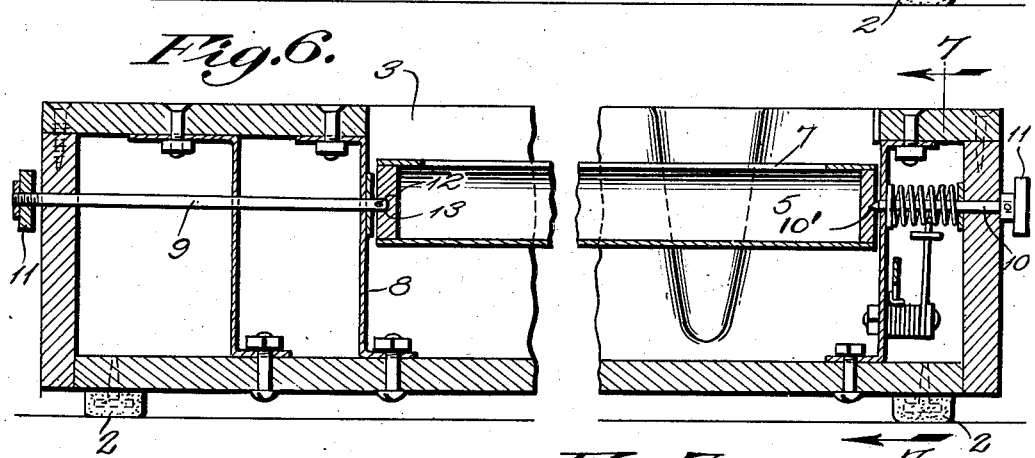
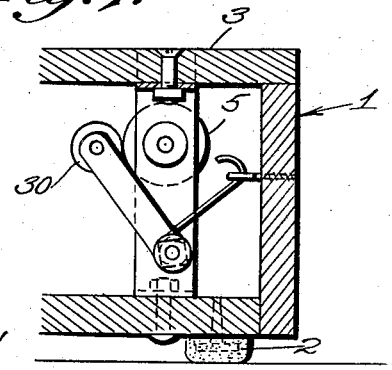
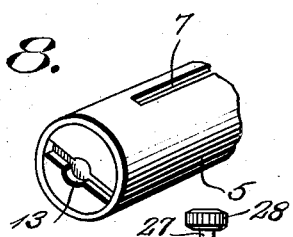
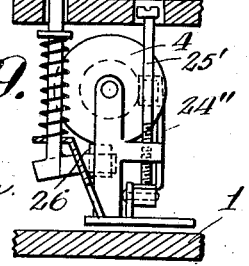

Patented June 28, 1938

2,121,797

UNITED STATES PATENT OFFICE 2,121,797

TRANSCRIPT OR NOTE HOLDER

Hal B. Holland, Praise, Ky., assignor, by mesne assignments, of one-fifth to Joe Powell, Praise, Ky.

Application October 19, 1936, Serial No. 106,445

1 Claim. (Cl. 40—31)

This invention relates to transcript or note holders especially adaptable for speakers or persons delivering addresses, and has for the primary object the provision of a device of this character which will conveniently and clearly display a transcript or notes so as to be unnoticeable by an audience and of a type which will advance the transcript or notes to reading position under direct control of the speaker and may be started and stopped with minimum effort on the part of the speaker.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a top plan view illustrating a transcript or note holder constructed in accordance with my invention.

Figure 2 is a transverse sectional view taken on the line 2—2 of Figure 1.

Figure 3 is a fragmentary perspective view illustrating one end of a drive roller.

Figure 4 is a fragmentary perspective view illustrating a shaft coupling to engage with said end of the drive roller.

Figure 5 is a sectional view taken on the line 5—5 of Figure 1.

Figure 6 is a sectional view taken on the line 6—6 of Figure 2.

Figure 7 is a sectional view taken on the line 7—7 of Figure 6.

Figure 8 is a fragmentary perspective view illustrating one end of a feed roller.

Figure 9 is a sectional view taken on the line 9—9 of Figure 2.

Referring in detail to the drawings, the numeral 1 indicates a casing of any suitable shape and provided with feet 2 so that it may rest evenly upon a speaker's desk. The top of the casing has a slight slope thereto and is provided with a window 3 through which may be viewed a transcript or notes. Arranged directly below the window 3 is a table 4 over which the transcript passes from a feed roller 5 to a drive roller 6. The rollers 5 and 6 are of hollow formation having formed therein slots 7 to receive the ends of the paper on which the transcript or notes are prepared, thereby forming a temporary anchorage for the transcript or note pages on said rollers.

Supports 8 are arranged in the casing 1 adjacent one end thereof for rotatably and slidably supporting rods 9 and 10 both of which extend through opposite sides of the casing and have secured thereto finger pieces 11. The rod 9 is equipped with a pin 12 received in the notched end 13 of the feed roller 5 whereby said feed roller may be rotated by rotating the finger piece of the rod 9. The rod 10 is spring pressed and fits in a socket 10' formed in the other end of the feed roller. The rod 10 by manipulating the finger piece 11 thereof may be moved endwise to disengage the same from the feed roller and thereby free the latter for removal from the casing.

A support 14 is located in the casing adjacent the end opposite to the end having the supports 8 and slidably supports a spring pressed rod 15 equipped with a finger piece 16 located exteriorly of the casing. An arbor 17 is located in the casing 1 opposite the support 14 and forms part of a spring motor 18 of a conventional construction. The spring motor may be wound by a key 19 arranged exteriorly of the casing. The driven shaft of the spring motor is indicated by the character 20 and has a cup-shaped head 21 provided with a projection 22. The cup-shaped head 21 fits in a grooved end 23 of the drive roller. The grooved end also has notches 24 of the head 21 to receive projections 24' whereby a detachable driving connection is established between the spring motor and the drive roller. The spring motor 18 includes a governor 25 for controlling the speed of operation thereof. The governor is engaged by a spring pressed brake shoe 26 and having an operating rod 27 extending exteriorly of the casing to which a finger piece 28 is applied. By depressing the finger piece 28 the governor may be freed so that the spring motor may operate under the control of said governor. As soon as the finger piece 28 is released the brake shoe 26 engages the governor and stops the action of the motor. The drive shaft of the motor 18 is indicated at 18' and a pawl and ratchet mechanism 19' connects said shaft 18' to a gear 20', the latter being journaled on the shaft 18'. The gear 20' is connected to the shaft 20 by a gear 21'. The governor shaft is indicated by the character 22' and is connected to the shaft 20 by a worm and worm gear indicated by the character 23'. A brake 24" is provided for the governor for controlling the speed of the latter and its braking action is controlled by a set bolt 25' extending through the top of the casing.

While I have described and shown the drive roller being driven by a spring motor it is to be understood that through minor alterations the drive roller may be driven by an electric motor or some other similar device.

To prevent the feed roller from rotating too freely it is engaged by a pivotally mounted tension roller 30 which will place thereon sufficient drag to prevent excessive unwinding of the transcript or note paper from said feed roller.

A paper guide 31 is mounted in the casing and extends transversely of the table through which the paper passes from the feed roller to the drive roller and is in the form of a slotted plate. A suitable gage 32 is slidably mounted on the paper guide and may be adjusted towards either end thereof so that it may be brought in contact with the edges of strips of paper which vary as to width.

In operation, the transcript or note paper is first wound upon the feed roller and then connected to the drive roller to expose a portion of the written matter on the paper through the window and as the address made by the speaker advances he may also advance the paper to bring the undelivered matter or notes into view thereby allowing the speaker to readily refresh his memory.

Having described the invention, I claim:

A device of the character set forth comprising a casing having a window, drive and feed rollers journaled in said casing and having passing from one to the other transcript or note paper, and a spring motor detachably connected to the drive roller and including a governor having a disc as a part thereof, and an adjustable brake coacting with the disc to vary the speed of operation of the spring motor other than that provided for by said governor, and a manually releasable self applying brake mechanism coacting with the disc to automatically stop said spring motor when manually released.

HAL B. HOLLAND.